United States Patent [19]

Bearden

[11] Patent Number: 5,549,145
[45] Date of Patent: Aug. 27, 1996

[54] BALANCING SKID FOR TREE HARVESTING MACHINE

[76] Inventor: Herman G. Bearden, 3639 Highway 33, Ruston, La. 71270

[21] Appl. No.: 491,451

[22] Filed: Jun. 16, 1995

[51] Int. Cl.$^6$ ................................................. A01G 23/08
[52] U.S. Cl. ........................... 144/34.1; 83/928; 30/371; 56/10.1; 56/15.2; 56/15.6; 56/291; 144/336; 144/4.1
[58] Field of Search .................................. 37/302; 30/390, 30/371, 379; 83/928; 56/10.1, 10.4, 15.2, 15.5, 291; 144/2 Z, 3 D, 34 R, 336, 2 N

[56] References Cited

U.S. PATENT DOCUMENTS

| | | | |
|---|---|---|---|
| 3,931,676 | 1/1976 | Merle | 30/371 |
| 4,338,985 | 7/1982 | Smith et al. | 144/34 R |
| 4,355,670 | 10/1982 | Ohrberg et al. | 144/34 R |
| 4,726,118 | 2/1988 | Mattson et al. | 144/1 E |
| 4,827,617 | 5/1989 | Shepherd | 30/371 |
| 4,998,573 | 3/1991 | York | 144/34 R |

*Primary Examiner*—W. Donald Bray
*Attorney, Agent, or Firm*—John M. Harrison

[57] ABSTRACT

A balancing skid for a tree harvesting machine, which balancing skid is designed to mount adjacent to the cutting assembly beneath the cutting frame of the tree harvesting machine and spaced from the existing blade skid to balance the cutting assembly horizontally and facilitate more accurate and cleaner horizontal cuts of the trees being harvested, with minimum blade warp and tooth damage. The balancing skid includes a steel skid plate characterized by a substantially horizontal plate base and a plate skid extending upwardly from one end of the base plate in angular relationship and terminating in a skid nose. The plate base and plate skid are welded to a base connector and a skid connector, respectively, and the base connector and skid connectors are, in turn, welded to the cutting frame or undercarriage of the tree harvesting machine to securely mount the skid plate on the tree harvesting machine.

9 Claims, 1 Drawing Sheet

BALANCING SKID FOR TREE HARVESTING MACHINE

BACKGROUND OF THE INVENTION

Field of the Invention

This invention relates to tree harvesting machines which utilize rotating cutter blades to cut the trees during the harvesting operation. More particularly, the invention relates to a balancing skid for mounting on the undercarriage of a tree harvesting machine and balancing the cutting wheel, cutter blades and cutting assembly in a horizontal plane to help prevent warping or bending of the saw blade and chipping or breaking of the saw teeth during the tree-cutting operation. The balancing skid includes an upward-projecting plate skid extending from a substantially horizontal plate base for bouncing over stumps, limbs and other obstacles and, in cooperation with an existing conventional blade skid mounted on the undercarriage of the tree harvesting machine, serves to maintain the cutting wheel and cutter blades in a substantially horizontal orientation to facilitate cleaner and more efficient cutting of the trees during harvesting.

One of the problems which exists in tree harvesting machines fitted with rotating cutting wheels and cutter blades, is that of maintaining the cutting wheel and cutter blades in a substantially horizontal orientation when the cutting wheel and cutter blades cut a tree harvested by the machine. The machine is customarily fitted with a conventional blade skid which is welded or otherwise mounted on the undercarriage of the tree harvesting machine for the purpose of protecting the cutter blades and cutting wheels from stumps, limbs, rocks and other obstacles in the path of the tree harvesting machine. However, the conventional blade skid is usually mounted across the diameter of the cutting assembly, which includes the cutting wheel and cutter blades in the tree harvesting machine. This lack of symmetry, support and balance in the cutting assembly sometimes causes the cutting wheel and cutter blades to engage a tree in angular relationship, which applies warping or bending pressure to the cutting wheel and may also damage the cutter blades. The imbalance in the cutting wheel and cutter blades results from contact of the single, elongated, rather narrow conventional blade skid with the uneven ground or a limb, rock or log as the cutting assembly is lowered to cut a tree, thus tilting the cutting wheel and cutter blades from the horizontal during cutting of the tree. Since the cutting wheel and cutter blades are expensive and a significant amount of time is required to replace one or more of these elements, it is significant from an operational standpoint to maintain both the cutting wheel and the cutter blades in good condition.

Accordingly, it is an object of this invention to provide a new and improved balancing skid for tree harvesting machines, which balancing skid is mounted on the opposite side of the cutting assembly from the existing blade skid, to balance and horizontally stabilize the cutting assembly and facilitate substantially horizontal cutting of trees harvested by the machine.

Another object of the invention is to provide a new and improved balancing skid for mounting on the undercarriage of a tree harvesting machine in spaced relationship with respect to the conventional blade skid and adjacent to the cutting wheel for balancing and stabilizing the cutting assembly, including the cutting wheel and cutter blades, substantially in a horizontal plane and cutting trees with minimal blade binding and warp and reduced cutter blade damage during the cutting operation.

Still another object of this invention is to provide a new and improved balancing skid for mounting on a tree harvesting machine adjacent to the cutting wheel and cutter blades and opposite the existing blade skid, which balancing skid includes a flat blade base, a plate skid extending upwardly from the blade base in angular relationship and connecting elements mounting the blade base and plate skid to the machine undercarriage, which balancing skid cooperates with the existing blade skid to protect the cutting wheel and cutter blades, and balance and stabilize the cutting wheel and cutter blades and facilitates substantially horizontal cutting of the trees during harvesting.

SUMMARY OF THE INVENTION

These and other objects of the invention are provided in a new and improved balancing skid for mounting on the undercarriage of a tree harvesting machine having a blade skid, a cutting head and cutter blades for cutting trees, which balancing skid is shaped and designed to compliment the existing blade skid and help protect the cutting wheel and cutter blades, as well as to horizontally stabilize and balance the cutting wheel and cutter blades and facilitate substantially horizontal cutting of trees harvested by the machine.

BRIEF DESCRIPTION OF THE DRAWING

The invention will be better understood by reference to the accompanying drawing, wherein.

DESCRIPTION OF THE PREFERRED EMBODIMENTS

Figure 2:
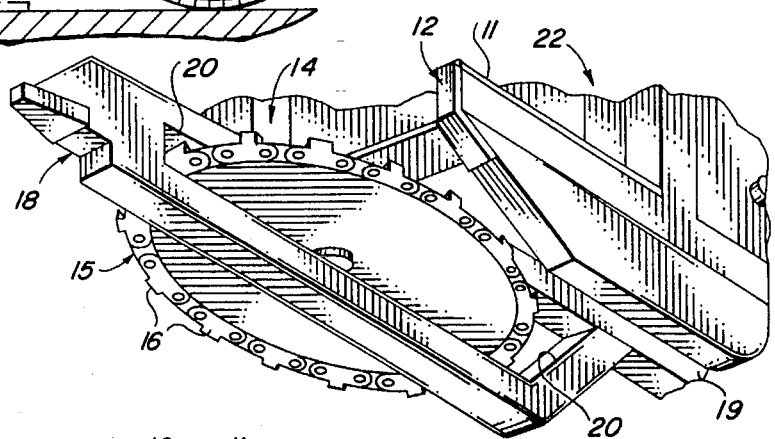
FIG. 2 is a perspective view, partially in section, of the cutting assembly and blade skid components of the tree harvesting machine illustrated in FIG. 1 with the balancing skid removed.

Referring initially to FIG. 2 of the drawing, the undercarriage 12 and cutting assembly 14 of a typical tree harvesting machine 22 is illustrated, with the cutting wheel 15 and cutter blade 16 elements of the cutting assembly 14 rotatably mounted in the undercarriage 12. A blade skid 18 is fixed to the undercarriage 12 and the cutting wheel 15 and cutter blades 15 rotate through a blade skid slot 20, in the blade skid 18.

Figure 1:
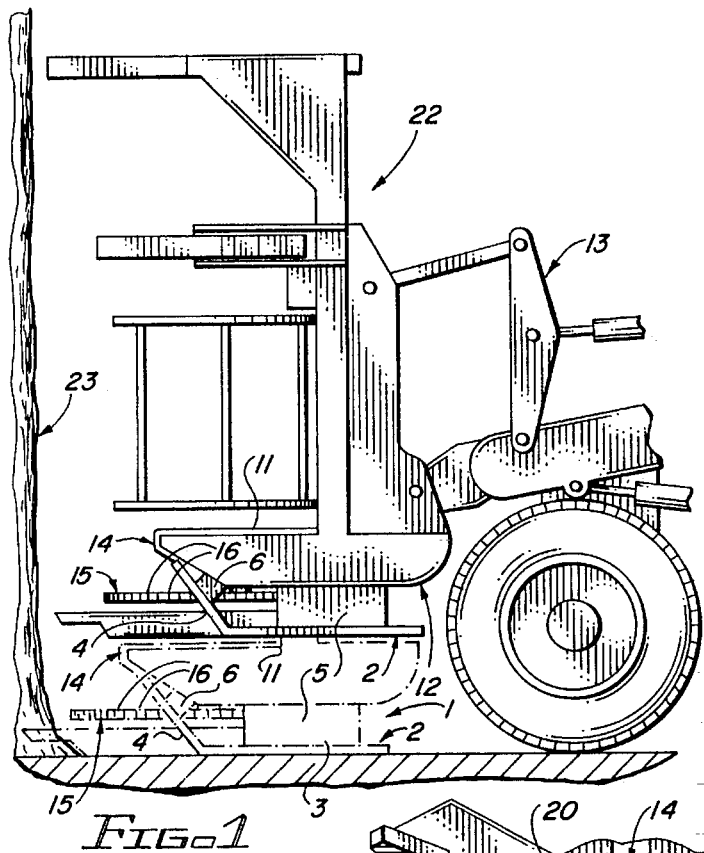
FIG. 1 is a side view, partially in section, of the balancing skid of this invention mounted on the undercarriage of a tree harvesting machine, with the cutting assembly in close proximity to a tree ready for harvesting.
Figure 3:
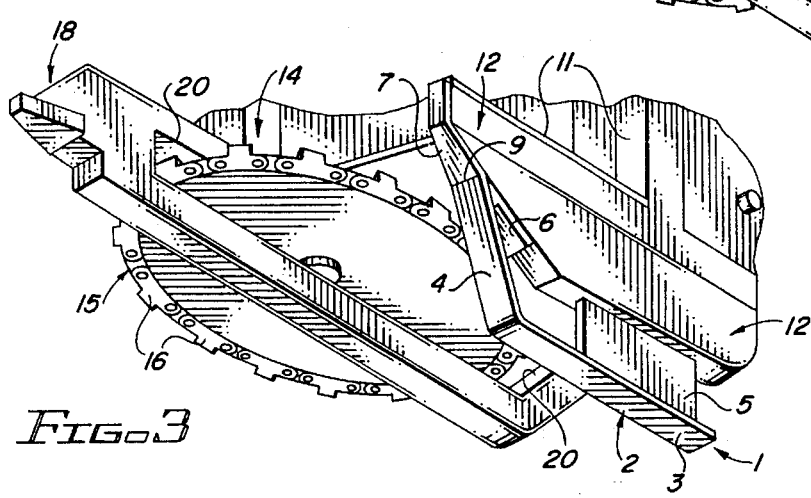
FIG. 3 is a perspective view, partially in section, of the cutting assembly and blade skid elements illustrated in FIG. 2, with the balancing skid of this invention mounted on the undercarriage of the tree harvesting machine adjacent to the cutting assembly.

Referring now to FIGS. 1 and 3 of the drawing, in a preferred embodiment the balancing skid of this invention is mounted on the undercarriage 12 of the tree harvesting machine 22 and is generally illustrated by reference numeral 1. The balancing skid 1 is characterized by a steel skid plate 2, which includes a flat, substantially horizontally-oriented plate base 3, having a plate skid 4 extending in angular relationship upwardly from the plate base 3 at a base-skid bend 8 in the skid plate 2. A skid nose 7 extends farther upwardly from the plate skid 4 to the box plate 11, at a skid-nose bend g in the skid plate 2, as further illustrated in FIG. 3. A base connector 5 is welded to the plate base 3 and a corresponding skid connector 6 is similarly welded to the plate skid 4 as further illustrated in FIG. 3. The base connector 5 and skid connector 6 are, in turn, welded to the undercarriage 12 of the tree harvesting machine 22, at a location adjacent to the existing cutting assembly 14 and spaced from the conventional blade skid 18, as further illustrated in FIGS. 1 and 3. Accordingly, it will be appreciated from a consideration of FIG. 3 that the balancing skid 1 and the blade skid 18 span and protect the cutting assembly 14, which includes the cutting wheel 15, rotatably extending from the undercarriage 12 and through the blade skid slot 20 in the blade skid 18, in conventional fashion and fitted with conventional cutter blades 16 on the periphery thereof. The conventional blade skid 18 is bolted or otherwise attached to the undercarriage 12 of the tree harvesting machine 22, in conventional fashion. It will be appreciated from a consideration of FIGS. 1 and 3 that when the tree harvesting machine 22 is operated and the cutting wheel 15 is rotated by a driving mechanism (not illustrated) known to those skilled in the art and conventional in the tree harvest machine 22, the cutter blades 16 also rotate through the blade skid slot 20 of the blade skid 18, in close proximity to the parallel balancing skid 1. The plate base 3 of the balancing skid 1 and the bottom surface of the blade skid 18 are coplanar, to stabilize the cutting wheel 15 in a horizontal cutting plane. The balancing skid 1 and blade skid 18 also cooperate to protect the cutting wheel 15 and cutter blades 16 from obstacles as the tree harvesting machine advances toward a tree 23 to be harvested, as further illustrated in FIG. 1. Consequently, both the balancing skid 1 and the blade skid 18 will bounce in concert over stumps, limbs, rocks and other irregularities in the terrain 24 to maintain the cutting wheel 15 and cutter blade 16 in spaced relationship with respect to the underlying terrain 24. Accordingly, since the balancing skid 1 is located in spaced, coplanar relationship with respect to the blade skid 18 and is positioned adjacent to the cutting wheel 15 and cutter blade 16, it serves to balance and stabilize application of the cutting wheel 15 and cutter blades 16 to the tree 23 being harvested and facilitates a substantially horizontal cut into and through the tree 23, as illustrated in FIG. 1. This substantially horizontal cutting operation, wherein the cutting assembly 14 is lowered into the horizontal tree cutting configuration illustrated in phantom in FIG. 1, reduces binding and warping of the cutting wheel 15, as well as chipping and breaking of the cutter blades 16 due to the entering of the cutter blades 16 and the cutting wheel 15 into the tree 23 at an angle rather than horizontally. Raising and lowering of the cutting assembly 14 is effected conventionally by operation of the adjusting linkage 13, illustrated in FIG. 1.

It will be appreciated by those skilled in the art that the size and configuration of the balancing skid 1 may vary, depending upon the design of the tree harvesting machine 22, undercarriage 12 and corresponding blade skid 18, conventionally provided in the tree harvesting machine 22 in question. For example, the plate base 3 and/or plate skid 4 of the balancing skid 1 may be shortened or lengthened, the size of the base connector 5 and skid connector 6 may vary and the balancing skid 1 may be mounted on either side of the undercarriage of the tree harvesting machine 22, depending upon the configuration, location and design of the cutting assembly 14, undercarriage 12 and other elements of the tree harvesting machine 22. Furthermore, the thickness and materials of construction of the skid plate 2, as well as the base connector 5 and skid connector 6, may vary, depending upon the type of service required, the size of the tree harvester machine 22, the nature of the terrain and the type and size of the trees to be harvested.

While the preferred embodiments of the invention have been described above, it will be recognized and understood that various modifications may be made in the invention and the appended claims are intended to cover all such modifications which may fall within the spirit and scope of the invention.

Having described my invention with the particularity set forth above, what is claimed is:

1. A balancing skid for a tree harvesting machine having a cutting wheel and cutter blades for cutting trees and a blade skid for protecting the cutting wheel and cutter blades, said balancing skid comprising a plate base, a plate skid upward-turned from said plate base, a base connector welded to said plate base and the tree harvesting machine and a skid connector welded to said plate skid and the tree harvesting machine, said base connector and said skid connector operable to fixedly connect said plate base and said plate skid to the tree harvesting machine, said plate skid and said skid connector positioned adjacent to the cutting assembly and spaced from the blade skid, for further protecting the cutting assembly and substantially horizontally balancing the cutting assembly in the tree harvesting machine.

2. The balancing skid of claim 1 comprising an upward-turned skid nose extending in angular relationship from said plate skid, said skid nose welded to the tree harvesting machine for further protecting the cutting assembly in the tree harvesting machine.

3. The balancing skid of claim 2 wherein said skid nose is tapered to define an end portion terminating said skid nose.

4. A balancing skid for protecting and laterally stabilizing a cutting wheel in a tree harvesting machine having a blade skid, said balancing skid fixedly attached to the tree harvesting machine in spaced relationship with respect to the blade skid and comprising a plate base; a plate skid upward-turned from said plate base; a base connector welded to said plate base and the tree harvesting machine and a skid connector welded to said plate skid and the tree harvesting machine, wherein the cutting wheel is disposed between said balancing skid and the blade skid, whereby said balancing skid and the blade skid protect the cutting wheel and maintain the cutting wheel in a substantially horizontal configuration in the tree harvesting machine when the tree harvesting machine is harvesting a tree.

5. The balancing skid of claim 4 comprising an upward-turned skid nose extending in angular relationship from said plate skid, said skid nose welded to the tree harvesting machine for further protecting the cutting assembly in the tree harvesting machine.

6. The balancing skid of claim 5 wherein said skid nose is tapered to define an end portion terminating said skid nose.

7. A balancing skid for protecting and horizontally positioning a cutting wheel in a tree harvesting machine having a blade skid fixedly connected to the undercarriage of a harvesting machine adjacent to the cutting wheel on one side of the cutting wheel, said balancing skid fixedly attached to the undercarriage of the tree harvesting machine adjacent to the cutting wheel on the opposite side of the cutting wheel from the blade skid and comprising a flat, elongated plate base; a flat plate skid upward-turned in angular relationship from said plate base; a base connector welded to said plate base and to the undercarriage of the tree harvesting machine and a skid connector welded to said plate skid and to the undercarriage of the tree harvesting machine, wherein the cutting wheel is disposed between said balancing skid and the blade skid, whereby said balancing skid and the blade skid are positioned substantially in a horizontal plane to protect the cutting wheel and maintain the cutting wheel in a substantially horizontal configuration in the tree harvesting machine when the tree harvesting machine is harvesting a tree.

8. The balancing skid of claim 7 comprising an upward-turned skid nose extending in angular relationship from said plate skid, said skid nose welded to the tree harvesting machine for further protecting the cutting assembly in the tree harvesting machine.

9. The balancing skid of claim 8 wherein said skid nose is tapered to define an end portion terminating said skid nose.

* * * * *